(12) United States Patent  
Smith

(10) Patent No.: US 8,763,502 B2  
(45) Date of Patent: Jul. 1, 2014

(54) FEATHERBOARD ASSEMBLY

(75) Inventor: Darrin E. Smith, Barrie (CA)

(73) Assignee: Jessem Tool Company, Barrie, Ontario (CA)

( * ) Notice: Subject to any disclaimer, the term of this patent is extended or adjusted under 35 U.S.C. 154(b) by 728 days.

(21) Appl. No.: 12/478,198

(22) Filed: Jun. 4, 2009

(65) Prior Publication Data

US 2010/0307302 A1 Dec. 9, 2010

(51) Int. Cl.
*B26D 7/06* (2006.01)
*B27C 5/02* (2006.01)

(52) U.S. Cl.
USPC ....... 83/13; 83/440; 83/420; 83/446; 144/253

(58) Field of Classification Search
USPC ......... 83/420, 440, 446, 447, 441.1; 144/253, 144/134, 253.1–253.91
See application file for complete search history.

(56) References Cited

U.S. PATENT DOCUMENTS

| | | | | |
|---|---|---|---|---|
| 4,476,757 A * | 10/1984 | Morris | ............................ | 83/446 |
| 5,000,237 A * | 3/1991 | Berkeley et al. | ........... | 144/251.3 |
| 5,546,670 A * | 8/1996 | Chiang | ............................ | 33/640 |
| 6,619,347 B2 * | 9/2003 | Jukoff et al. | ............... | 144/253.6 |
| 6,718,857 B2 * | 4/2004 | Kimmel et al. | ................. | 83/447 |
| 6,968,766 B2 * | 11/2005 | Kimmel et al. | ................. | 83/447 |
| 7,017,464 B2 * | 3/2006 | Coderre | .......................... | 83/446 |
| 7,140,286 B2 * | 11/2006 | Schwartz | ......................... | 83/446 |
| 7,299,840 B1 * | 11/2007 | Moschetti | ................. | 144/253.6 |
| 7,341,081 B1 * | 3/2008 | Villiger | ...................... | 144/253.8 |
| 7,882,866 B2 * | 2/2011 | Burrows | ..................... | 144/135.2 |
| 7,942,174 B2 * | 5/2011 | Kozina et al. | .............. | 144/253.6 |
| 2002/0162439 A1 * | 11/2002 | Fontaine | ......................... | 83/438 |

* cited by examiner

*Primary Examiner* — Ghassem Alie
*Assistant Examiner* — Bharat C Patel
(74) *Attorney, Agent, or Firm* — Senniger Powers LLP

(57) ABSTRACT

A featherboard assembly for use with a work table. The featherboard assembly includes a featherboard having a body and an axis. The featherboard assembly further includes an adjustment mechanism associated with the featherboard for attaching the featherboard to the work table. The adjustment mechanism permits the featherboard to be adjusted on the table along a first axis and permits the featherboard to be adjusted along a second axis. The adjustment mechanism is capable of locking the featherboard against movement along the second axis while the featherboard is moved along the first axis and locking the featherboard against movement along the first axis while the featherboard is moved along the second axis.

14 Claims, 13 Drawing Sheets

FEATHERBOARD ASSEMBLY

BACKGROUND OF THE INVENTION

The present invention relates generally to cutting apparatus and accessories and more particularly to a featherboard assembly.

A featherboards is an accessory used with a work table such as a table saw or router table to safely guide a piece of stock along the table as the stock is cut by a cutting implement. The featherboard opposes forces generated by the cutting implement tending to push the stock away from the cutting implement as the stock is moved past the cutting implement. Conventional featherboards are mounted on the work table and adjusted to a desired position to accommodate the size of the stock to be cut. However, the adjustment features of these featherboards are limited. Accordingly, there exists a need for a featherboard having an improved adjustment mechanism.

SUMMARY OF THE INVENTION

In one aspect, the invention is directed to a featherboard assembly for use with a work table. The featherboard assembly comprises a featherboard having a body and an axis. The featherboard assembly further comprises an adjustment mechanism associated with the featherboard for attaching the featherboard to the work table. The adjustment mechanism permits the featherboard to be adjusted on the table along a first, x-axis and permits the featherboard to be adjusted along a second, y-axis. The adjustment mechanism is capable of locking the featherboard against movement along the y-axis while the featherboard is moved along the x-axis to a selected position of x-adjustment and locking the featherboard against movement along the x-axis while the featherboard is moved along the y-axis to a position of y-adjustment.

In another aspect, the invention is directed to a method of adjusting a featherboard with respect to a work table. The featherboard includes a body and an axis. The method comprises attaching the featherboard to the work table and moving the featherboard along the table along a first axis. The featherboard is then locked against movement along the first axis. The method further comprises moving the featherboard along a second axis while the featherboard is locked against movement along the first axis. The featherboard is then locked against movement along the second axis.

In yet another aspect, the invention is directed to a featherboard assembly for use with a work table. The featherboard assembly comprises a first featherboard having a body and an axis and a second featherboard having a body and an axis. The featherboard assembly further comprises an adjustment mechanism associated with the first and second featherboards for attaching the featherboards to the work table. The adjustment mechanism also permits the featherboards to be adjusted on the table along a first, x-axis and permits the featherboards to be adjusted along a second, y-axis. The adjustment mechanism is capable of locking the featherboards against movement along the y-axis while the featherboards are moved along the x-axis to a position of x-adjustment and locking the featherboards against movement along the x-axis while the featherboards are moved along the y-axis to a position of y-adjustment.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
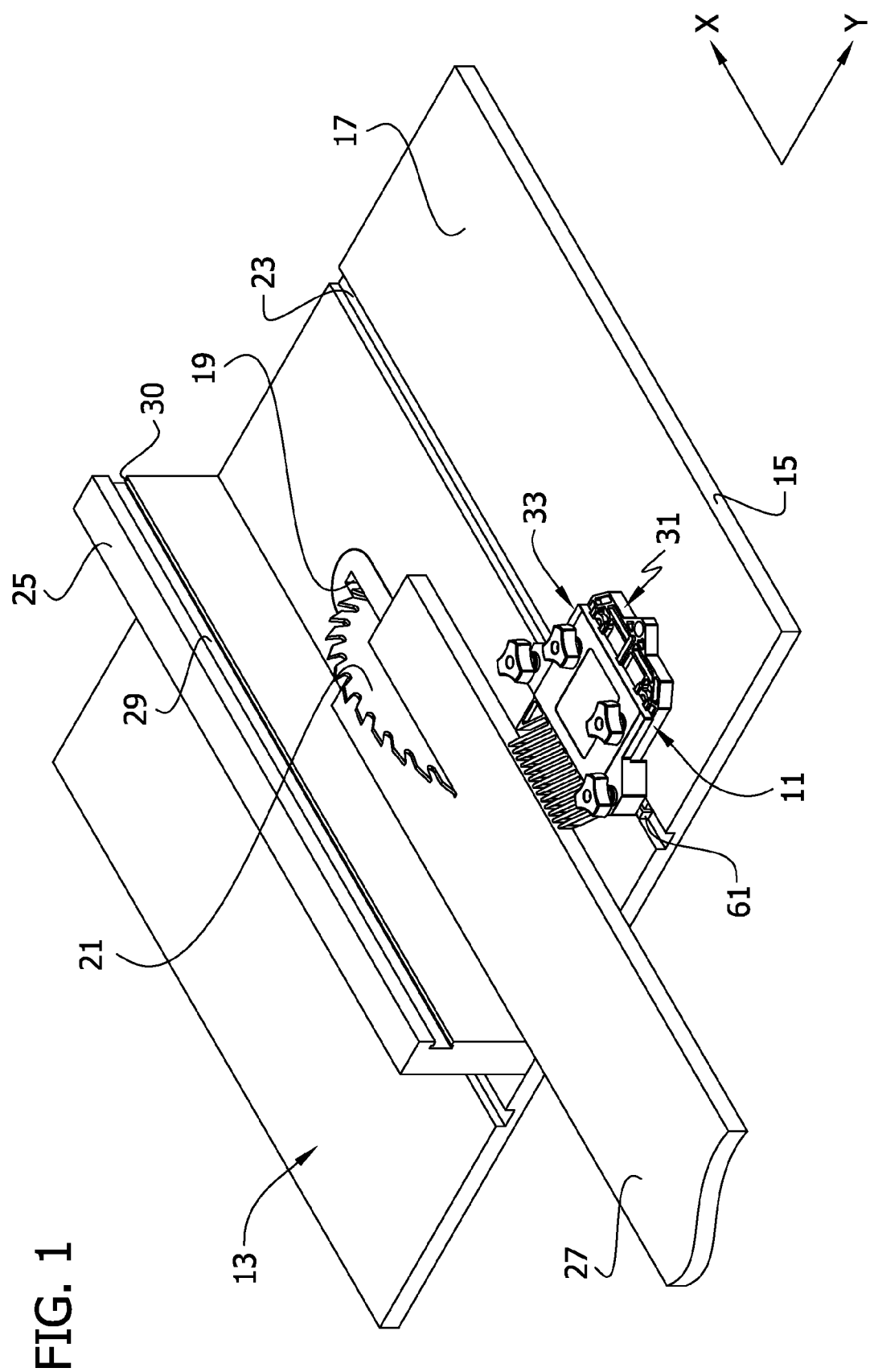
FIG. 1 is a perspective of a featherboard assembly of the present invention attached to a work table.

Referring to FIG. 1, a featherboard assembly is generally indicated at 11. The featherboard assembly is adapted for attachment to a work table 13. FIG. 1 depicts the work table 13 as a table saw including a table 15 having a surface 17, an opening 19 in the table, a rotatable blade 21 disposed in the opening and a groove 23 in the table. A fence 25 is positioned on the surface 17 of the table 15. The fence 25 has a channel 29 extending along the length of the fence. The channel 29 has lips 30. The featherboard assembly 11 and fence 25 are adapted to guide a piece of stock 27 past the blade 21 as the stock is moved across the surface 17 of the table 15. The featherboard assembly 11 can be used with other work tables such as router tables without departing from the scope of the invention.

Figure 2:
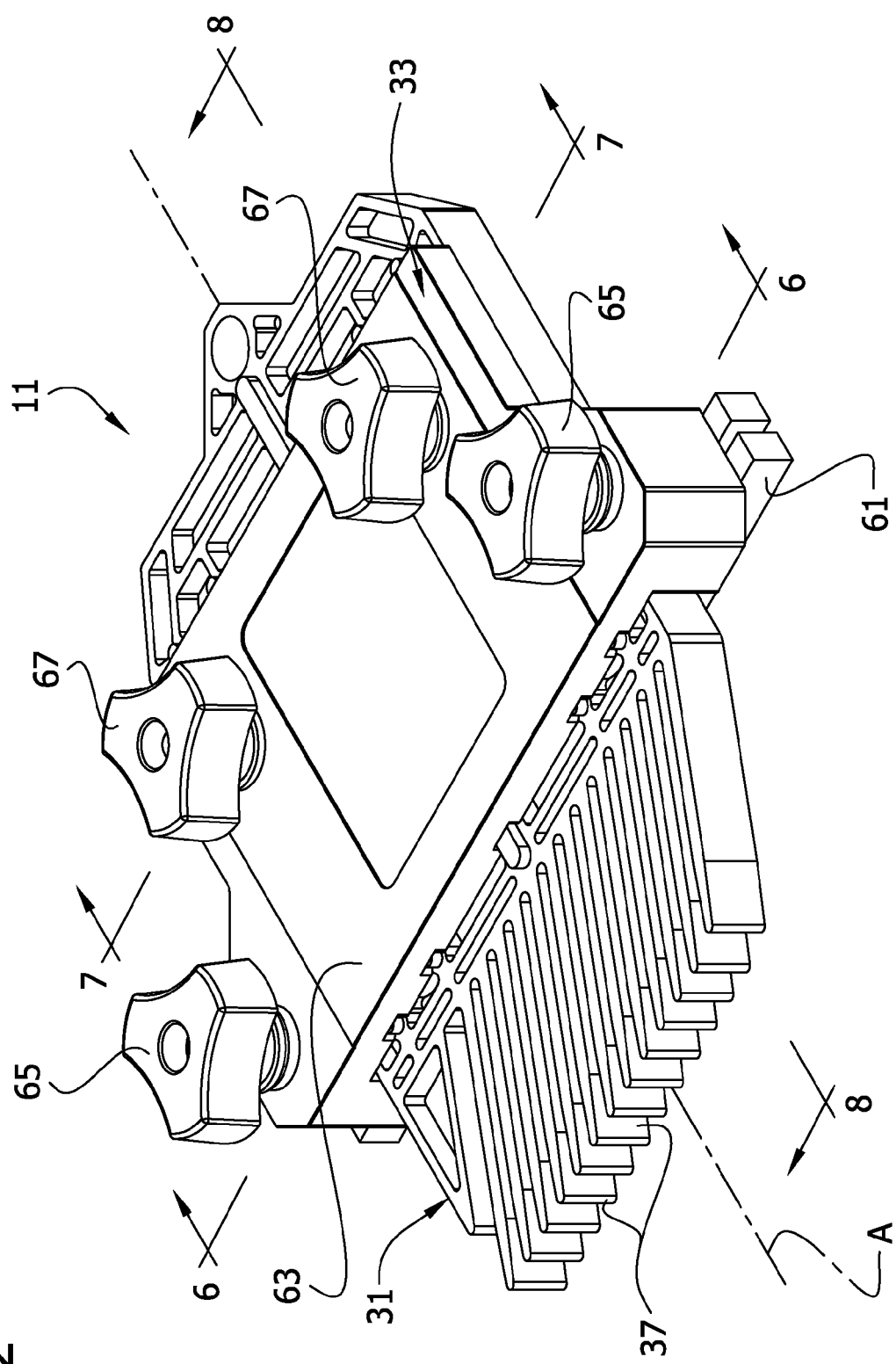
FIG. 2 is a perspective of the featherboard assembly.
Figure 3:
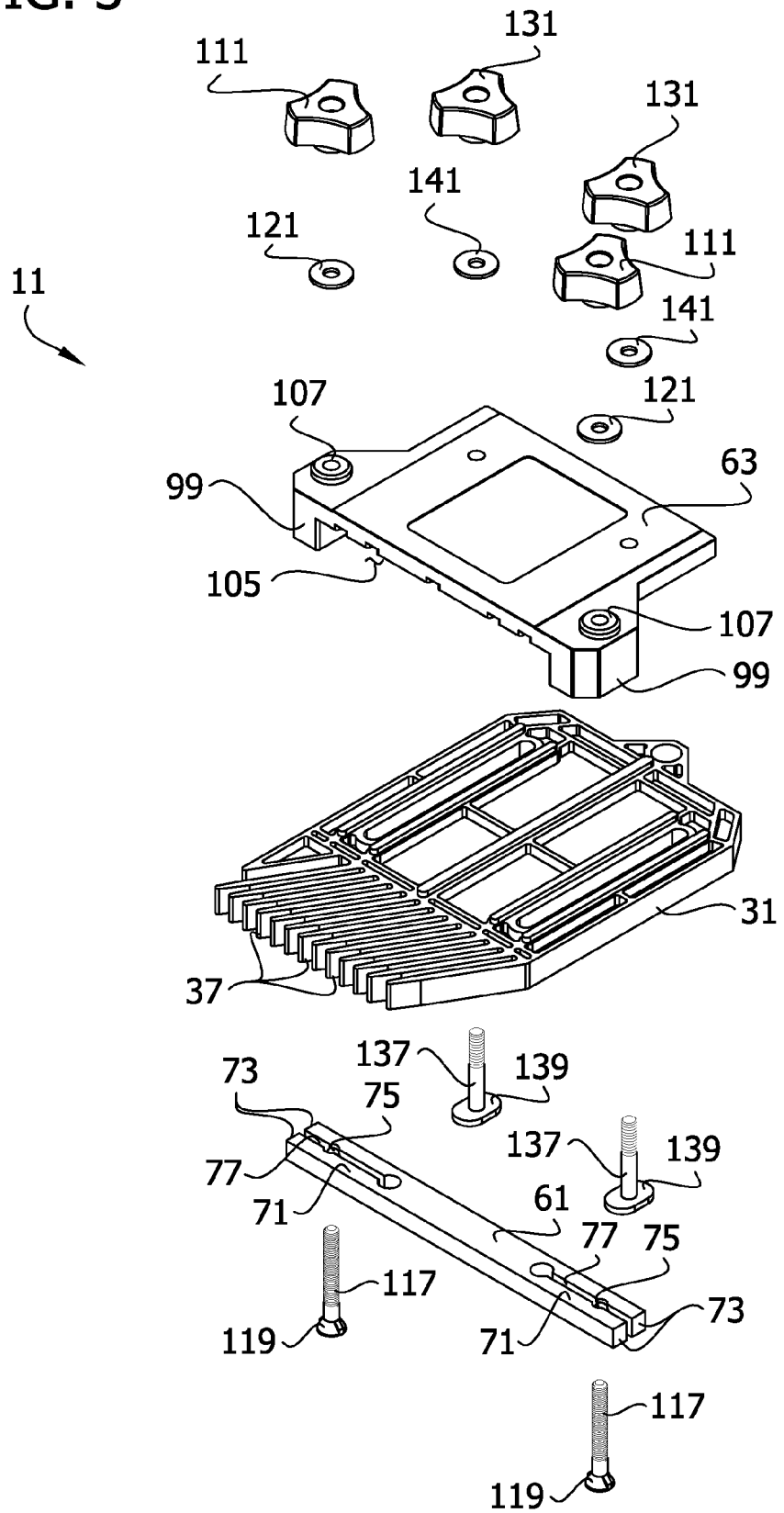
FIG. 3 is an exploded view of the featherboard assembly.

Referring to FIGS. 1-3, the featherboard assembly 11 comprises a featherboard 31 and an adjustment mechanism 33 associated with the featherboard for attaching the featherboard to the work table 13. The adjustment mechanism 33 permits the featherboard 31 to be adjusted with respect to the table along a first, x-axis and along a second, y-axis. In the illustrated embodiment, the x-axis corresponds to the longitudinal axis of the groove 23 in the table 15, and the y-axis extends generally at 90 degrees with respect to the x-axis in a generally horizontal plane. However, the axes can be oriented at other angles and orientations with respect to each other. As will be explained in greater detail later, the adjustment mechanism 33 is operable to lock the featherboard in selected positions of x-adjustment and y-adjustment.

Figure 4:
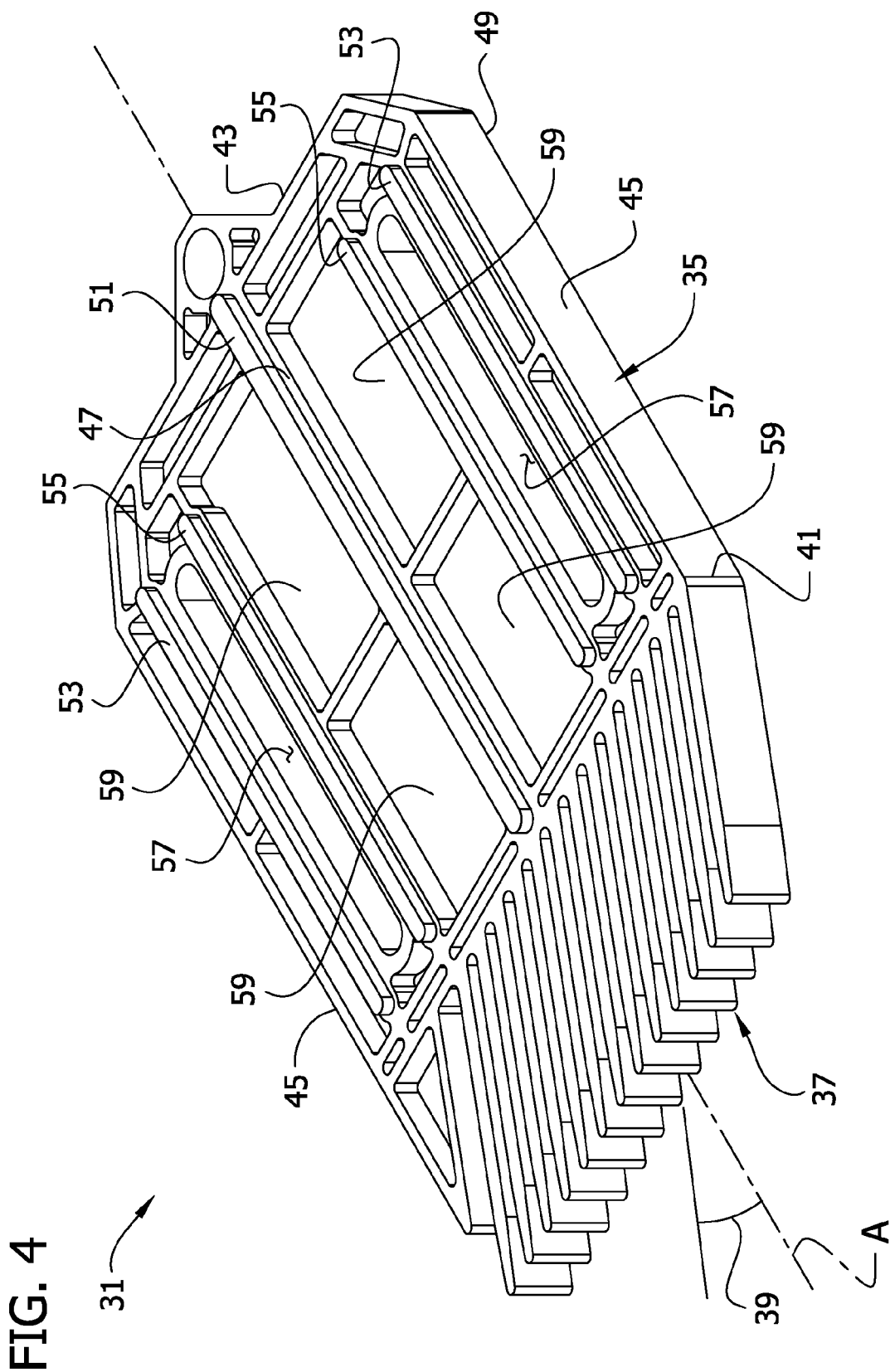
FIG. 4 is a top perspective of a featherboard of the featherboard assembly.

Referring to FIG. 4, the featherboard 31 includes a body 35, fingers 37 projecting from the body and an axis A. The fingers 37 project from the body 35 at an angle 39 relative to the axis A. In the illustrated embodiment, the angle 39 is less than 90 degrees. This angle and configuration of the fingers 37 is well known in the art. The fingers 37 have rounded edges to reduce markings on the stock 27 when the featherboard 31 comes in contact with the stock.

The body 35 of the featherboard 31 is generally rectangular, having a front 41, a back 43, opposite sides 45, a top 47 and a bottom 49. A number of elongate projections extend along the top 47 and bottom 49 of the body 35 generally parallel to the axis A. The projections include central projections 51, 51' (see FIG. 6) disposed generally midway between opposite sides 45 of the body 35, outboard projections 53, 53' disposed generally adjacent opposite sides of the body, and inboard projections 55, 55' spaced inboard of the outboard projections on opposite sides of the central projections. Slots 57 are provided in the body 35 between the inboard and outboard projections 55, 55' and 53, 53'. The slots 57 extend generally parallel to the projections 51, 51' 53, 53' 55, 55'. Cutouts 59 in the body 35 reduce the amount of material used to make the featherboard 31.

Referring to FIGS. 2 and 3, the adjustment mechanism 33 comprises a slider device 61, a guide 63, a set of first fasteners 65 and a set of second fasteners 67. These components are described in greater detail below.

The slider device 61 comprises an elongate member having bifurcated ends 71 each of which is defined by opposing spaced apart end portions 73 separated by a gap 77. Each end 71 has a frustoconical opening 75 extending through the slider device 61 in the gap 77 (see FIG. 6). The slider device 61 is positioned under the body 35 of the featherboard 31 and is sized and shaped to slide in the groove 23 in the work table 13. While the illustrated embodiment shows a "bar" type slider device, other configurations such as discrete (separate) slide members can be used.

Figure 5:
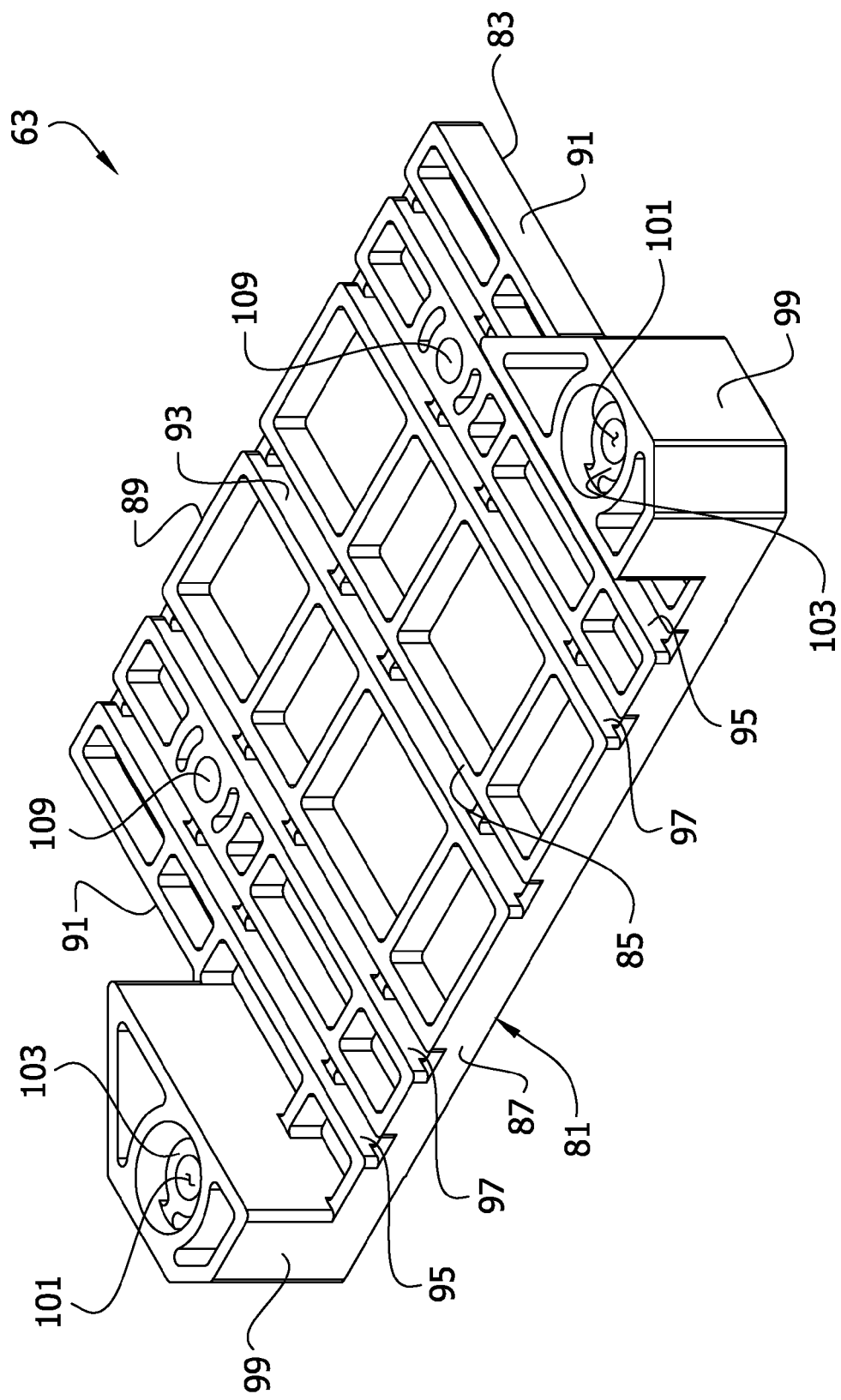
FIG. 5 is a bottom perspective of a guide of the featherboard assembly.

Referring to FIGS. 3 and 5, the guide 63 has a generally rectangular body 81 having a top 83, a bottom 85, a front 87, a back 89 and opposite sides 91. A number of elongate recesses extend along the bottom 85 of the body 81. The recesses include a central recess 93 disposed generally midway between opposite sides 91 of the body 81, a first pair of outboard recesses 95 disposed generally adjacent opposite sides of the body, and a second pair of inboard recesses 97 spaced inboard of the outboard projections on opposite sides of the central projection. A pair of legs 99 extend down from the body 81. A first pair of holes 101 extends through the legs 99. The holes 101 are countersunk to provide a shoulder 103 disposed in each of the holes. The legs 99 and the front 89 of the guide 63 form a channel-shaped opening 105 (FIG. 3) for receiving the featherboard 31 such that the featherboard is positioned at least partially between the slider device 61 and the guide. For reasons that will be explained later, the top 83 of the guide includes a pair of bosses 107 on the legs 99. The guide 63 also has a second pair of holes 109 which extend through the body 81.

Figure 6:
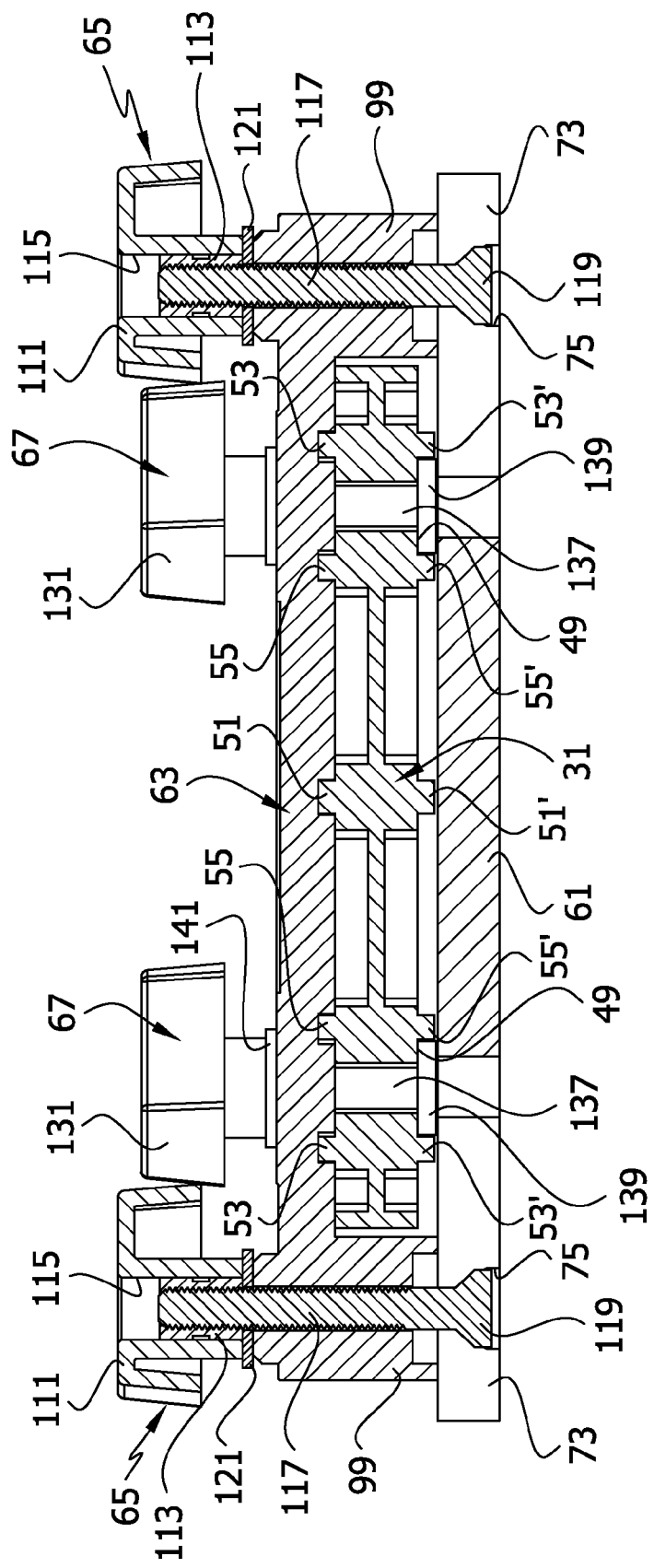
FIG. 6 is a section taken in a plane including line 6-6 in FIG. 2.

The featherboard 31, slider device 61 and guide 63 are attached to each other by the first fasteners 65 (see FIG. 6). Each first fastener comprises a knob 111, a threaded insert 113 press fit in an opening 115 in the knob, and a shaft 117 having an upper end threaded in the insert and a lower flared end 119. The shafts 117 of the two fasteners 65 extend up through the frustoconical openings 75 in the slider device 61, through the respective holes 101 in the legs 99 of the guide 63 and into the threaded inserts 113 in the knob 111. Washers 121 are disposed between the legs 99 and the knobs 111. The flared ends 119 are shaped such that they are received in the frustoconical openings 75 to retain the slider device 61 in assembly with the guide 63. Rotation of the knobs 11 causes the shafts 117 and their flared ends 119 to move upward. The upward movement of the flared ends 119 into the gaps 77 forces the end portions 73 of the slider device 61 away from each other. As a result, when the slider device 61 is positioned in the groove 23 in the work table 13, the end portions 73 of the slider device move into pressure engagement with side walls of the groove to secure the featherboard assembly 11 to the work table 13.

Referring to FIG. 1, the slider device 61 permits the featherboard assembly 11 to be moved along the groove 23 to a selected position of x-adjustment. The slider device 61 can then be secured at that location using the first fasteners 65.

The featherboard assembly 11 is also separately adjustable along the y-axis, as shown in FIG. 1. In one configuration (FIG. 6), the top 47 of the featherboard 31 engages the bottom 85 of the guide 63 allowing the featherboard to be slideably moved along the y-axis relative to the guide. The projections 51, 53, 55 on the featherboard 31 are received in respective recesses 93, 95, 97 in the guide 63 to guide the motion of the featherboard along the y-axis. In another configuration, the featherboard 31 can be flipped (rotated 180 degrees on axis A) so that the bottom 49 of the featherboard engages the bottom 85 of the guide 63. In this configuration, the projections 51', 53', 55' on the featherboard 31 are received in the recesses 93, 95, 97 in the guide 63 to guide the motion of the featherboard along the y-axis. The two configurations permit the featherboard assembly 11 to guide the piece of stock 27 in two different directions along the x-axis. As illustrated, the y-axis is substantially parallel to the axis A of the featherboard 31 when the featherboard is mounted on the work table 13. While the illustrated embodiments show the projections on the featherboard and the recesses in the guide, the projections could be on the guide and the recesses could be in the featherboard. Additionally, while multiple projections and multiple slots are shown, only a single slot or a single projection could be used without departing from the scope of the present invention.

Figure 7:
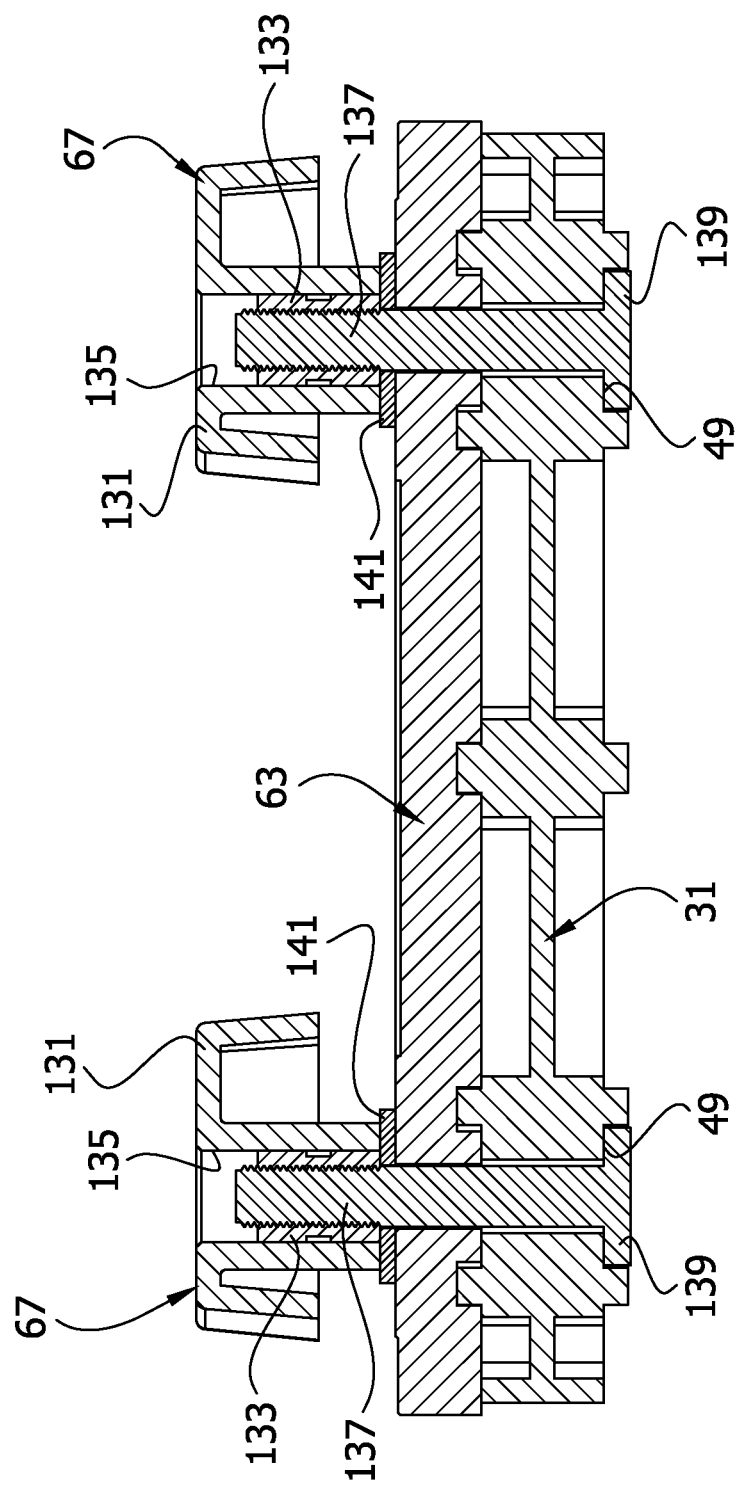
FIG. 7 is a section taken in a plane including line 7-7 in FIG. 2.
Figure 8:
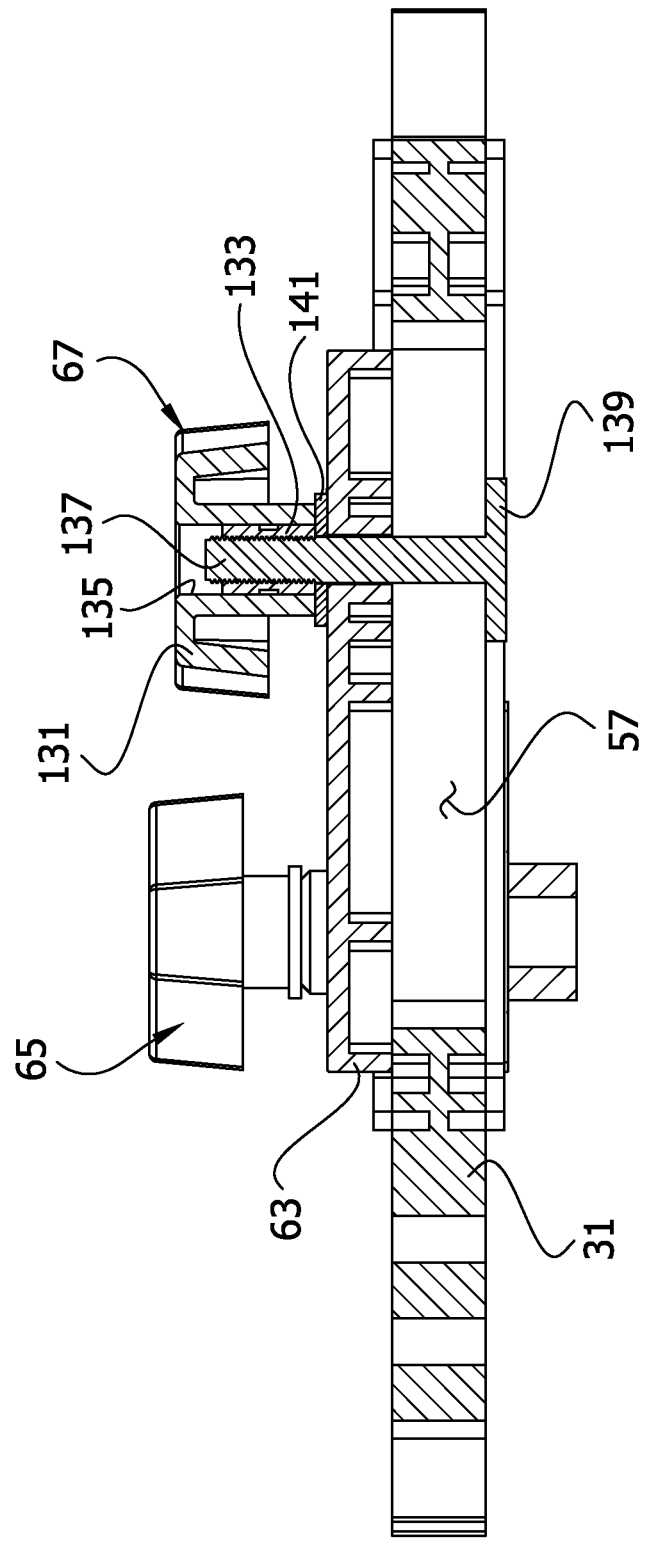
FIG. 8 is a section taken in a plane including line 8-8 in FIG. 2.
Figure 9:
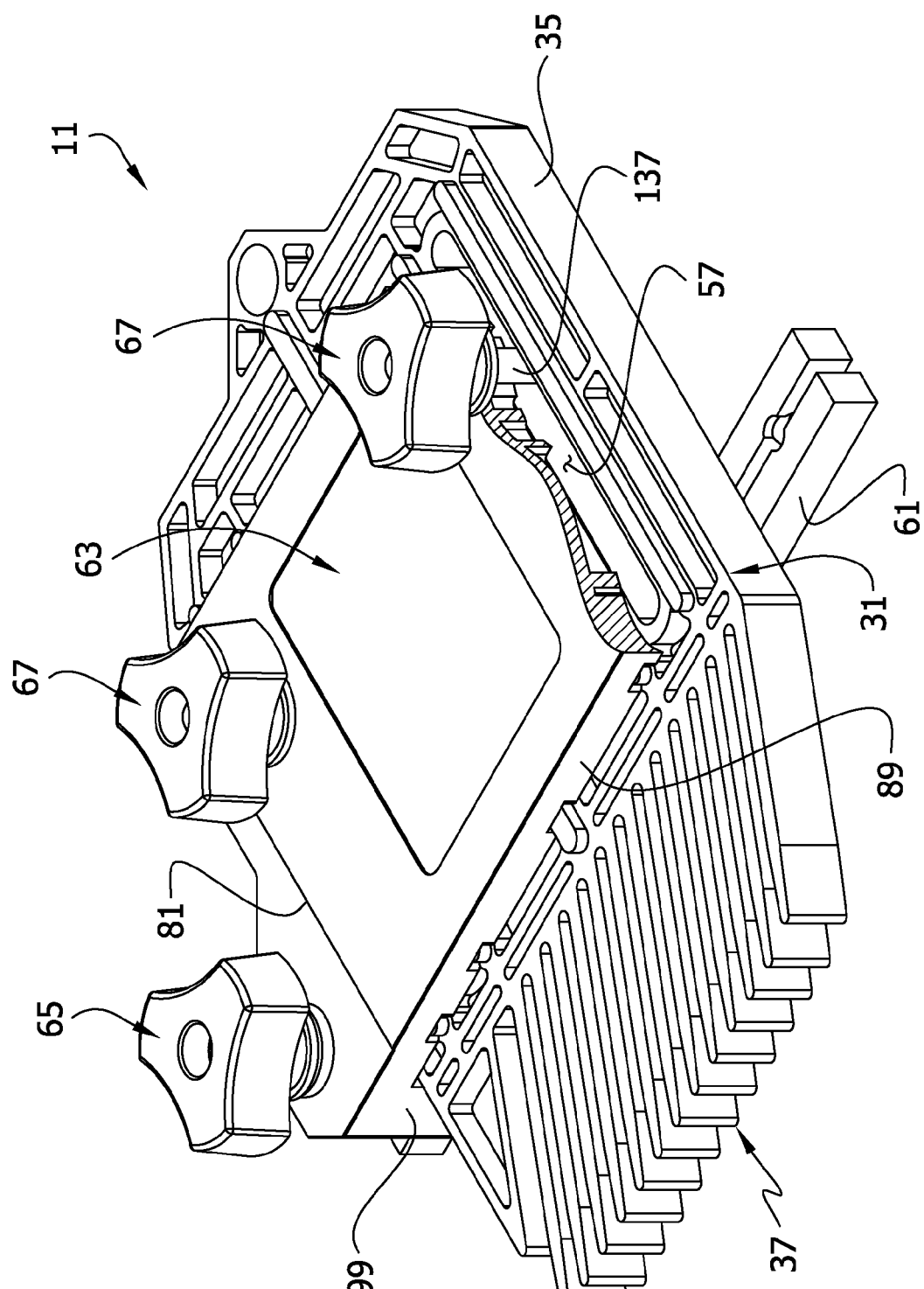
FIG. 9 is a perspective of the featherboard assembly with portions broken away to show a slot in the featherboard.

Referring to FIGS. 7, 8 and 9, the second fasteners 67 secure the featherboard 31 to the guide 63. In the illustrated embodiment, each second fastener 67 comprises a knob 131, a threaded insert 133 press fit in an opening 135 in the knob 131, and a shaft 137 having an upper end threaded in the insert. The shaft 137 has a head 139 at its lower end. The shafts 137 of the fasteners 67 extend up through respective slots 57 in the body 35 of the featherboard 31, through respective holes 109 in the guide 63 and into the threaded inserts 133 in respective knobs 131. Washers 141 are disposed between the guide 63 and the knobs 131. The head 139 at the lower end of each shaft 137 has a dimension greater than the width of the slot 57 so that it contacts the bottom 49 of the body 35 of the featherboard 31. The shaft 137 has a diameter slightly smaller than the width of the slot 57 to permit the shaft to move in the slot when the featherboard 31 is moved relative to the guide 63 to a selected y-position. When the featherboard 31 is in the selected y-position, the knobs 131 are rotated to move the shafts 137 and heads 139 upward to bring the heads into contact with the bottom 49 of the body 35 of the featherboard. Continued rotation of the knobs 131 forces the top 47 of the featherboard 31 into pressure contact with the bottom 85 of the guide 63 to secure the featherboard to the guide in the selected y-position of y-adjustment.

Optionally, the guide 63 can be turned around so that the front 87 of the guide is positioned adjacent the back 43 of the featherboard body 35 and the back 89 of the guide is adjacent the front 41 of the featherboard body. Because the second fasteners 67 are disposed near the back 89 of the guide 63, the shafts are in a more forward position when the guide is turned. As a result, more of the featherboard 31 is exposed when the shafts 137 are slid to the end of the slots 57. This gives the effect of additional adjustment along the y-axis.

The four-fastener construction described above allows the featherboard assembly 11 to be moved along the x-axis by sliding the slider device 61 in the groove 23. When the featherboard 31 is in a selected position of x-adjustment it is locked against movement along the x-axis by tightening the first fasteners 65. While locked against movement along the x-axis, the featherboard 31 can be adjusted along the y-axis by sliding the featherboard relative to the guide 63. When the featherboard 31 is in a selected position of y-adjustment it is locked against movement along the y-axis by tightening the second fasteners 67. Alternatively, the featherboard assembly can be first moved along the y-axis and locked and then moved along the x-axis and locked.

FIGS. 10-13 illustrate a second embodiment showing a double-featherboard assembly, generally designated 211. The featherboard assembly 211 comprises a first featherboard 231 and a first guide 263 each constructed identically to the featherboard 31 and guide 63 of the first embodiment. Accordingly, corresponding parts are given the same reference numbers plus 200. A second featherboard 331 and a second guide 363 are also provide and are also constructed identically to the featherboard 31 and guide 63 of the first embodiment. Accordingly, corresponding parts are given the same reference numbers plus 300.

The double-featherboard assembly 211 includes an adjustment mechanism 233 which is identical to the adjustment mechanism 33 of the first embodiment except as noted below. The adjustment mechanism 233 permits the featherboards 231, 331 to be adjusted with respect to the table 15 along a first, x-axis and along a second, y-axis. In the illustrated embodiment, the x-axis corresponds to the longitudinal axis of the channel 29 in the fence 25, and the y-axis extends generally at 90 degrees with respect to the x-axis in a generally vertical plane. However, the axes can be oriented at other angles and orientations with respect to each other. Each of the first and second featherboards 231, 331 are individually movable along the y-axis relative to the guides 263, 363. Therefore, the first featherboard 231 can be moved to a first position of y-adjustment and the second featherboard 331 can be moved to a second position of y-adjustment the same as or different from the position of the y-position of the first featherboard.

In the second embodiment, the second featherboard 331 and the second guide 363 are stacked on top of the first featherboard 231 and first guide 263. As shown best in FIG. 13, when the components are stacked the bosses 307 on the first (lower) guide 263 are received in the lower ends of the holes 401 in the second (upper) guide 363 to register the second guide with the first guide. Each first fastener 265 of the second embodiment comprises a knob 311, a threaded insert 313 press fit in an opening 315 in the knob, and a shaft 317 having an upper end threaded in the insert. The shaft 317 has a head 319 at its lower end. A discrete slide member 361 is disposed on the shaft 317 and held on the shaft 317 by the head 319. The shafts 317 of the first fasteners 265 extend through the respective slide members 361, through the holes 301, 401 in the guides 263, 363 and into the knobs 311. The first fasteners 265 require longer shafts 317 than the shafts 117 in the first embodiment because they must extend through two guides.

Figure 10:
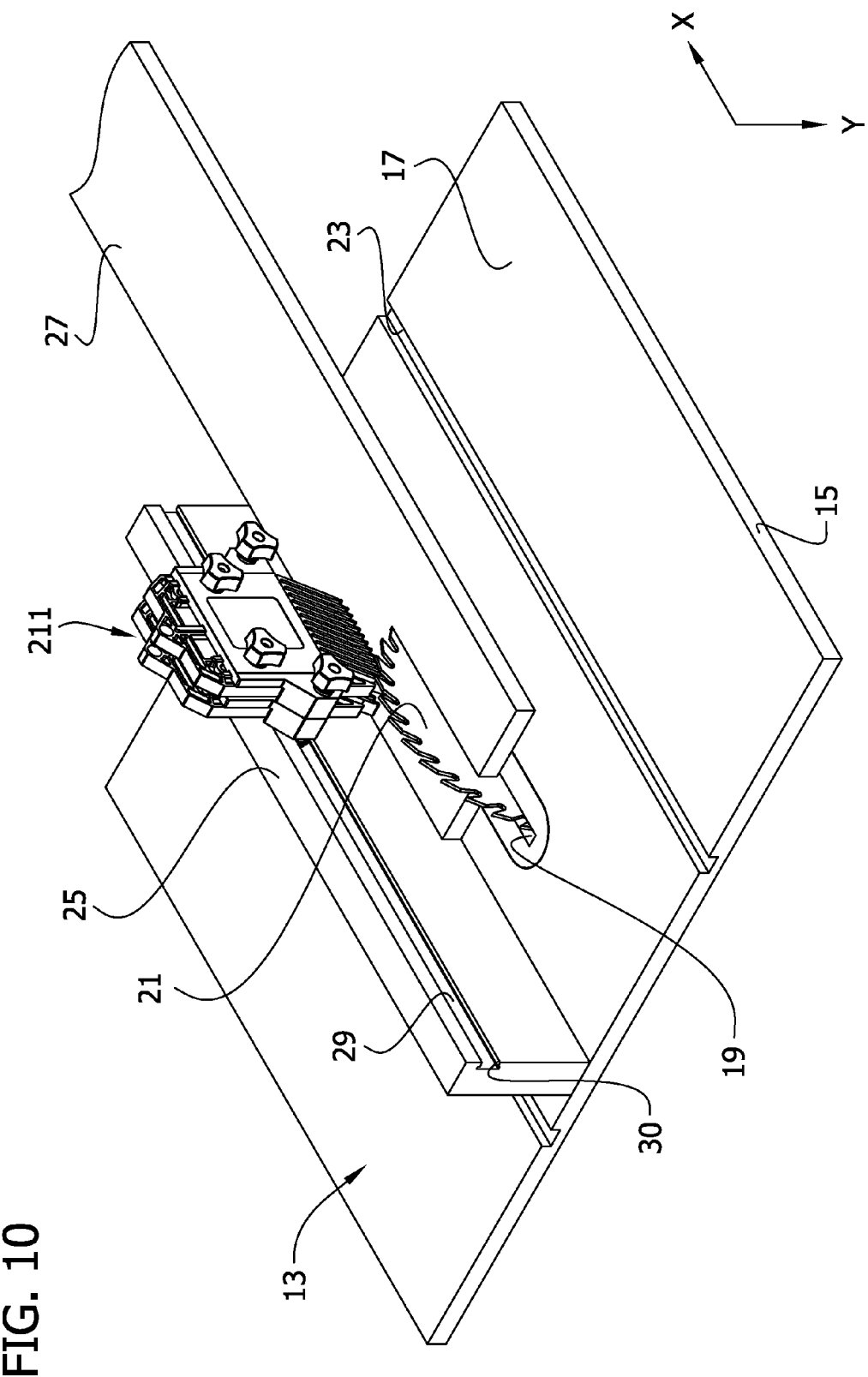
FIG. 10 is a perspective of a second embodiment of a featherboard assembly of the present invention attached to a fence on a work table.
Figure 11:
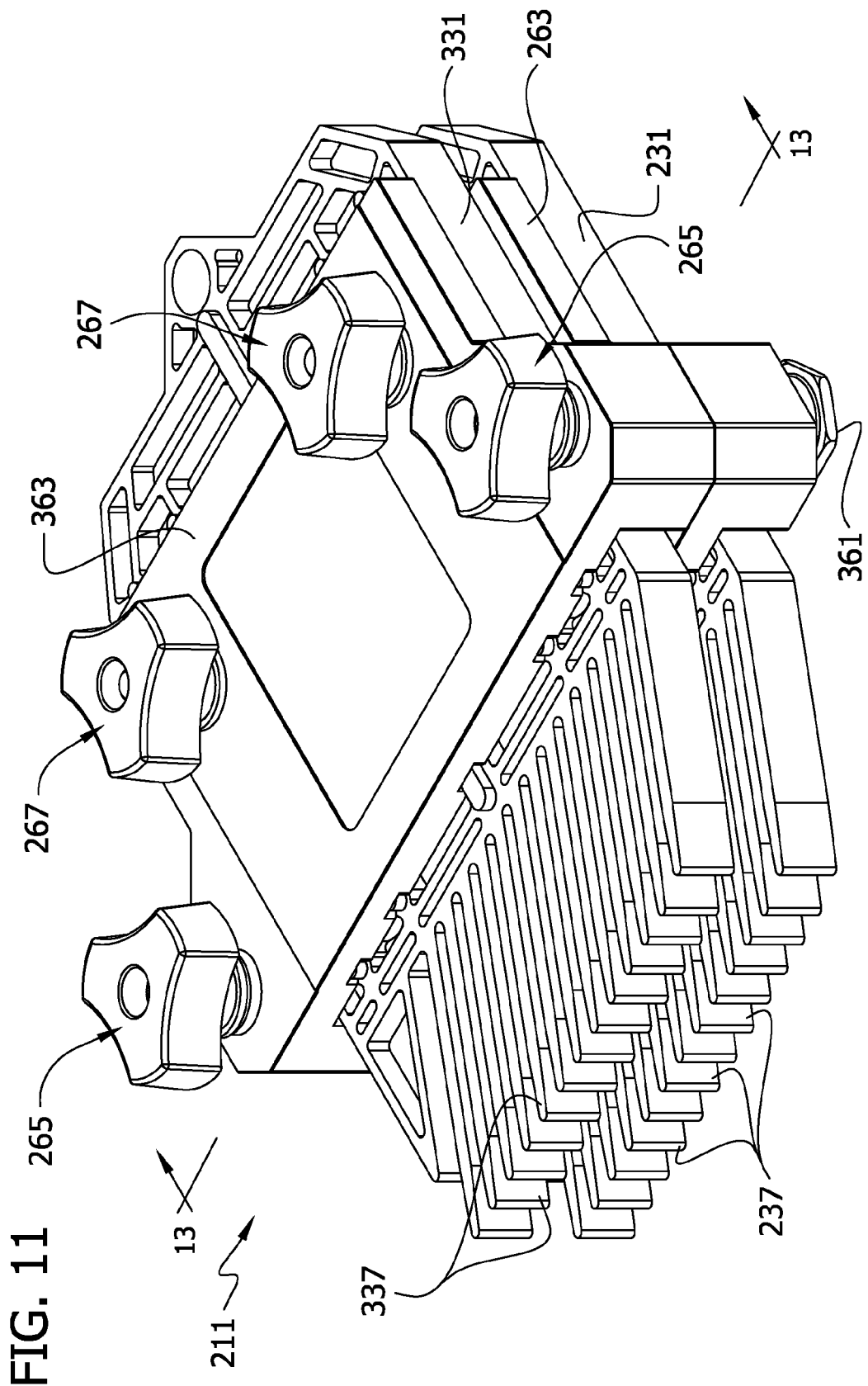
FIG. 11 is a perspective of the second embodiment of the featherboard assembly.
Figure 12:
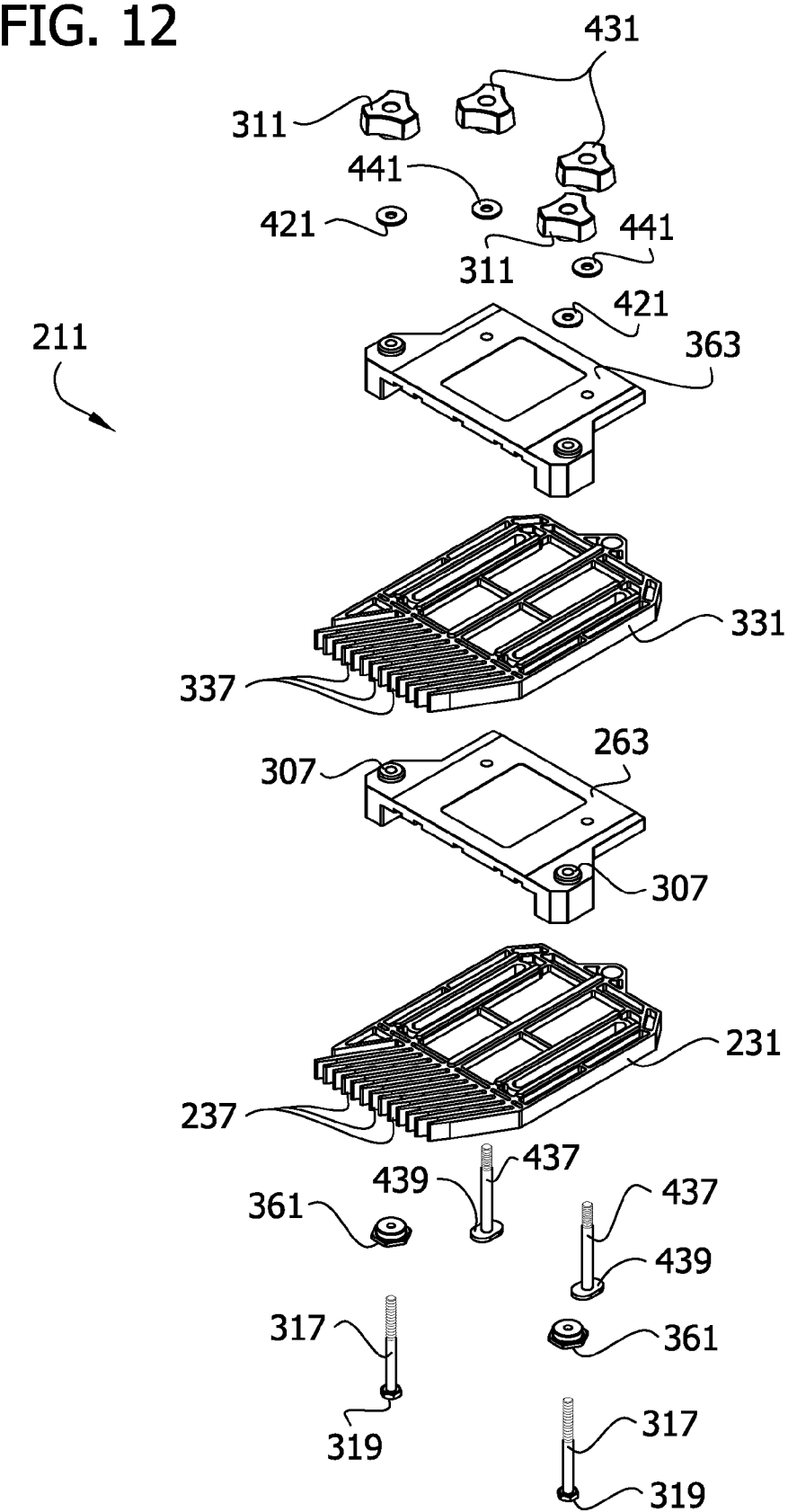
FIG. 12 is an exploded view of the second embodiment of the featherboard assembly.
Figure 13:
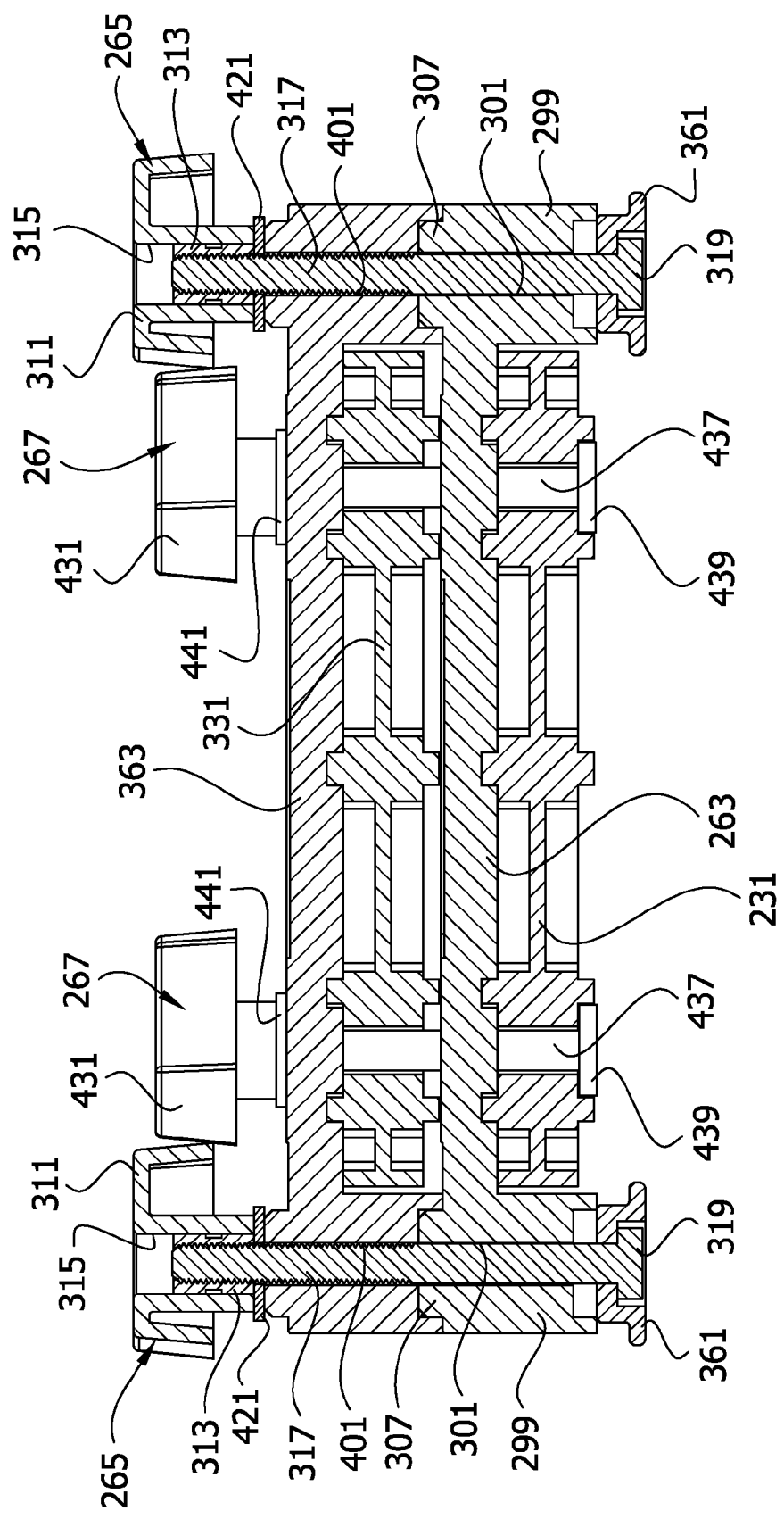
FIG. 13 is a section taken in a plane including line 13-13 in FIG. 11.

The discrete slide members 361 are used to attach the featherboard assembly 211 to the fence 25 on the work table 13 (see FIG. 10). The slide members 361 are received in the channel 29. The lips 30 retain the slide members 361 in the channel 29. Rotating the knobs 311 causes the slide members 361 to engage the lips 30 to secure the featherboard assembly 211 to the fence 25. The double featherboard configuration allows the featherboard assembly 211 to accommodate thicker or taller pieces of stock while maintaining the separate adjustability of each of the featherboards 231, 331 with respect to the guides 263, 363.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A featherboard assembly for use with a work table comprising:
a featherboard having a body and an axis; and
an adjustment mechanism associated with the featherboard for attaching the featherboard to the work table and permitting the featherboard to be adjusted on the table along a first, x-axis and permitting the featherboard to be adjusted along a second, y-axis, the adjustment mechanism comprising a guide separate from the body of the featherboard and separate from fingers of the featherboard for guiding movement of the body of the featherboard relative to the guide, a first locking element locking the body of the featherboard against movement relative to the guide along the y-axis but not locking the body of the featherboard against movement with the guide along the x-axis thus permitting the body of the featherboard to be moved on the table along the x-axis to a selected position of x-adjustment, and a second locking element locking the body of the featherboard against movement with the guide along the x-axis but not locking the body of the featherboard against movement relative to the guide along the y-axis thus permitting the body of the featherboard to be moved on the table along the y-axis to a selected position of y-adjustment.

2. The featherboard assembly as set forth in claim 1 wherein the x-axis is substantially perpendicular to the axis of the featherboard and the y-axis is substantially parallel to the axis of the featherboard when the featherboard assembly is mounted on the work table.

3. The featherboard assembly as set forth in claim 1 wherein the adjustment mechanism further comprises a slider device adapted to be mounted on the table for movement of the slider device along the x-axis relative to the table, the guide being securable to the slider device, the featherboard being at least partially disposed between the guide and the slider device such that the guide, slider device and featherboard are all movable along the x-axis with respect to the table.

4. The featherboard assembly as set forth in claim 3 wherein the guide comprises a body and legs extending from the body, the body and legs forming a channel-shaped opening for receiving the featherboard.

5. The featherboard assembly as set forth in claim 3 wherein the guide has first holes, the adjustment mechanism comprising first fasteners extending through the first holes and into the slider device to secure the featherboard assembly to the slider device.

6. The featherboard assembly as set forth in claim 5 wherein the slider device has bifurcated ends each defined by opposing end portions separated by a gap, and wherein each of said first fasteners comprises a shaft having a flared end, said shaft being rotatable in a respective first opening in the guide and extending through the gap in a respective bifurcated end of the slider device such that rotation of the shaft causes the flared end of the shaft to move into the gap and spread the opposing end portions of said respective bifurcated ends of the slider device away from each other for pressure engagement with the work table to secure the featherboard assembly to the work table.

7. The featherboard assembly as set forth in claim 5 wherein one of the featherboard body and guide includes at least one elongate projection extending along the y-axis and the other of the featherboard body and guide includes at least one elongate recess extending along the y-axis for receiving the projection to permit sliding movement of the featherboard along the y-axis.

8. The featherboard assembly as set forth in claim 7 wherein one of the featherboard body and guide includes slots and the other of the featherboard body and guide includes second holes separate from the first holes, the adjustment mechanism comprising second fasteners separate from the first fasteners extending through the second holes and the slots to secure the featherboard to the guide in a selected position of y-adjustment.

9. The featherboard assembly as set forth in claim 1 in combination with a table saw comprising a table having a surface, an opening in the surface, a blade rotatable in the opening, and a fence on the table, the featherboard assembly and fence being configured to guide a piece of stock past the blade for cutting the piece of stock when a user moves the stock across the surface of table into the blade.

10. The featherboard assembly as set forth in claim 1 in combination with a router and a router table.

11. A method of adjusting a featherboard assembly with respect to a work table, the featherboard assembly including a featherboard having a body, a guide separate from the featherboard, and an axis, the method comprising:
attaching the featherboard assembly to the work table and moving the featherboard body along the table along a first axis;
locking the featherboard body against movement along the first axis with a first locking element;
moving the featherboard body relative to the guide along a second axis while the featherboard body is locked against movement along the first axis by the first locking element, the guide being separate from fingers of the featherboard; and
locking the featherboard body against movement along the second axis with a second locking element, the first locking element not locking the featherboard body against movement along the second axis and the second locking element not locking the featherboard body against movement along the first axis.

12. The method as set forth in claim 11 wherein moving the featherboard body along the first axis comprises moving the featherboard body substantially perpendicular to the axis of the featherboard assembly and wherein moving the featherboard body along the second axis comprises moving the featherboard body substantially parallel to the axis of the featherboard assembly.

13. The method as set forth in claim 12 wherein attaching the featherboard assembly to the work table comprises positioning the featherboard between the guide and a slider device securable to the guide, and mounting the slider device on the work table.

14. The method as set forth in claim 13 wherein moving the featherboard body along the first axis comprises moving the slider device in a groove in the work table such that the body of the featherboard, the guide and the slider device all move together.

* * * * *